United States Patent Office 2,840,582
Patented June 24, 1958

2,840,582
DERIVATIVES OF 13-METHYL-17-HYDROXY-1,2,3,6,7,8,9,10,11,12,13,14,16,17 - TETRADECAHYDRO-15H-CYCLOPENTA[a]PHENANTHREN-3-ONES

Frank B. Colton, Chicago, Ill., assignor, by mesne assignments, to G. D. Searle & Co., Skokie, Ill., a corporation of Delaware No Drawing. Application August 31, 1953
Serial No. 377,700

6 Claims. (Cl. 260—397.47)

The present invention relates to a new group of organic polycyclic compounds and, more particularly, to the 13-methyl - 17 - hydroxy - 1,2,3,6,7,8,9,10,11,12,13,14,16,17-tetradecahydro - 15H - cyclopenta[a]phenanthren - 3-ones substituted in the 17-position by a member of the class consisting of glycolyl and $\alpha,\beta$-dihydroxyethyl radicals and their lower alkanoyl esters.

The compounds which constitute this invention can be represented by the structural formula

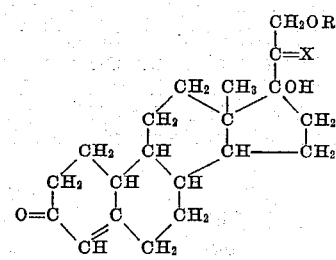

wherein the radical $=X$ is a member of the class consisting of $=O$,

and

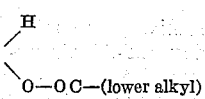

radicals and R is a member of the class consisting of hydrogen and —OC—(lower alkyl) radicals.

The claimed compositions are valuable in providing medicinal agents. They produce some of the therapeutic effects of the mineralocorticoid adrenal hormones, such as sodium retention and life maintenance, but lack the undesirable side effects which limit the clinical utility of the naturally occurring steroids. The specificity of the activity of the claimed compositions is demonstrated by the fact that while the 13-methyl-17-($\beta$-acetoxyacetyl)-17 - hydroxy - 1,2,3,6,7,8,9,10,11,12,13,14,16,17 - tetradecahydro-15H-cyclopenta[a]phenanthren-3-one has a potency in maintaining the life of adrenalectomized rats equal to that of desoxycorticosterone acetate, the compound in which the hydrogen atom in the 10-position is replaced by a methyl radical lacks this activity.

The compounds of this invention can be prepared by the methods described in my copending applications Serial No. 286,611, filed May 7, 1952, issued as U. S. Patent 2,655,518, and Serial No. 357,377, filed May 25, 1953, issued as U. S. Patent 2,704,768, of which the present application is a continuation-in-part. Additional useful procedures appear from the examples below.

These examples illustrate the compounds of my invention and the methods for their preparation. However, the invention is not to be construed as limited by the details set forth in spirit or in scope. It will be apparent to those skilled in the art that many modifications in materials and methods may be practiced without departing from the invention. In each of these examples, temperatures are given in degrees centigrade (° C.) and relative amounts of materials in parts by weight.

Example 1

A stirred solution of 10.6 parts of 3-methoxy-13-methyl - 1,4,6,7,8,9,11,12,13,14,16,17 - dodecahydro-15H - cyclopenta[a]phenanthren - 17 - one in 700 parts of anhydrous ether and 45 parts of dry toluene is cooled to 0° C. and saturated with dry acetylene. While a slow stream of acetylene is passed through the reaction mixture, a solution of 20 parts of potassium t-amylate in 135 parts of anhydrous pentanol is added in the course of 15 minutes with stirring. Passage of acetylene and stirring are continued for an additional 4½ hours. After standing at 0° C. for 16 hours, the mixture is washed with aqueous ammonium chloride solution until the aqueous phase is neutral, then with water and saturated sodium chloride solution. The organic layer is dried over anhydrous sodium sulfate, filtered and concentrated under vacuum to a residue of about 250 parts. 500 parts of petroleum ether are added and, after standing at 0° C. for an hour, the mixture is filtered. The collected precipitate is recrystallized from ether. The resulting 3-methoxy-13-methyl - 17 - ethynyl - 1,4,6,7,8,9,11,12,13,14,16,17 - dodeca - hydro - 15H - cyclopenta[a]phenanthren - 17 - ol melts at about 181–182° C. The molecular rotation as determined in a 1% chloroform solution is $[\alpha]_D = +65°$. An additional amount of this product can be obtained from the mother liquors by concentration under vacuum followed by addition of petroleum ether.

Example 2

To a refluxing solution of 47.5 parts of 3-methoxy-13-methyl - 17 - ethynyl - 1,4,6,7,8,9,11,12,13,14,16,17 - dodecahydro - 15H - cyclopenta[a]phenanthren - 17 - ol in 3200 parts of methanol and 1000 parts of water are added 240 parts of concentrated hydrochloric acid. Refluxing is continued for an additional 5 minutes after which the solution is maintained at room temperature for 15 minutes. Then 13,000 parts of water are added and the mixture is cooled to 0° C. After standing for several hours at that temperature, the mixture is filtered and the precipitate is dried and crystallized from ethyl acetate. The 13-methyl - 17 - ethynyl - 17 - hydroxy - 1,2,3,6,7,8,9,10,11,12,13,14,16,17 - tetradecahydro - 15H - cyclopenta[a]phenanthren-3-one thus obtained melts at about 202–204° C. The molecular rotation, as determined in a 1% chloroform solution, is $[\alpha]_D = -22.5°$. The ultraviolet absorption spectrum of a methanolic solution shows a maximum at 241 millimicrons with a molecular extinction coefficient of 17,100.

Example 3

A solution of 53.7 parts of 13-methyl-17-ethynyl-17-hydroxy - 1,2,3,6,7,8,9,10,11,12,13,14,16,17 - tetradecahydro-15H-cyclopenta[a]phenanthren-3-one in 1500 parts of dioxane and 1000 parts of pyridine is reduced in an atmosphere of hydrogen over 30 parts of a catalyst containing 5% palladium on calcium carbonate. On absorption of one molecule of hydrogen the reduction is stopped and the mixture is filtered. The filtrate is concentrated under vacuum to about 500 parts, diluted with 3000 parts of ether and washed with normal hydrochloric acid until a Congo red test shows an acidic reaction. The solution is washed sucessively with water, 5% sodium bicarbonate, water and saturated sodium chloride solution. The ether extract is dried over sodium sulfate, concentrated on the steam bath to about 500 parts and diluted with 800 parts of petroleum ether. After storage at 0° C. for 16 hours, the product is collected on a filter, dried and crystallized from a mixture of ethyl acetate and petroleum ether. The 13-methyl-17-vinyl-17- hydroxy - 1,2,3,6,7,8,9,10,11,12,13,14,16,17 - tetradecahydro-15H-cyclopenta[a]phenanthren-3-one thus obtained melts at about 169–171° C. The molecular rotation of an alcoholic solution is $[\alpha]_D = +36°$.

Example 4

A solution of 47.3 parts of phosphorus tribromide in 645 parts of anhydrous ethanol-free chloroform is added dropwise to a solution of 142.9 parts of 13-methyl-17-vinyl-17-hydroxy-1,2,3,6,7,8,9,10,11,12,13,14,16,17 - tetradecahydro-15H-cyclopenta[a]phenanthren-3-one in 2250 parts of chloroform and 10 parts of pyridine, maintained at —20° C. After standing at room temperature for 16 hours, the mixture is treated with chloroform and then successively with dilute hydrochloric acid, dilute sodium bicarbonate solution and finally with water. After drying over anhydrous sodium sulfate, the chloroform is stripped off, leaving as a residue the 17-(β-bromoethylidene)-13-methyl-1,2,3,6,7,8,9,10,11,12,13,14,16,17 - tetradecahydro-15H-cyclopenta[a]phenanthren-3-one.

45 parts of 17-(β-bromoethylidene)-13-methyl-1,2,3,6,7,8,9,10,11,12,13,14,16,17-tetradecahydro-15H - cyclopenta[a]phenanthren-3-one are treated with 400 parts of freshly fused potassium acetate and refluxed for 5 hours in 3200 parts of dry acetone. After cooling the precipitate is removed by filtration and the acetone is distilled in vacuum under nitrogen. The residue is extracted by refluxing with boiling petroleum ether and, after stripping of the solvent in vacuo, the residue is chromatographed over 4500 parts of silica gel. Elution with a 3% solution of ethyl acetate in benzene, evaporation of the solvent from the eluate and crystallization of the residue from aqueous acetone and petroleum ether yields 13-methyl-17-vinyl-1,2,3,6,7,8,9,10,11,12,13,14-dodecahydro-15H-cyclopenta[a]phenanthren-3-one, melting at about 100–101° C. The molecular rotation of an 0.66% chloroform solution is $[\alpha]_D = +110.5°$. The ultraviolet absorption spectrum of a methanolic solution shows a maximum at 237 millimicrons with a molecular extinction coefficient of 30,200. This compound has the structural formula

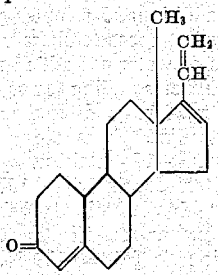

Elution of the chromatography column with a 10% solution of ethyl acetate in benzene, evaporation of the solvent from the eluate and recrystallization of the residue from aqueous acetone yields the 17-(β-acetoxyethylidene)-13-methyl-1,2,3,6,7,8,9,10,11,12,13,14,16,17 - tetradecahydro-15H-cyclopenta[a]phenanthren-3-one. This compound is obtained in two polymorphic crystalline forms, one melting at 49–50° C., the other melting at about 96–97° C. The molecular rotation of a 1% chloroform solution is $[\alpha]_D = +62.5°$. The ultraviolet absorption spectrum of a methanolic solution shows a maximum at 241 millimicrons with a molecular extinction coefficient of 17,800. This compound has the structural formula

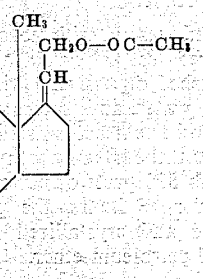

Example 5

To a solution of 25 parts of 17-(β-acetoxyethylidene)-13-methyl-1,2,3,6,7,8,9,10,11,12,13,14,16,17 - tetradecahydro-15H-cyclopenta[a]phenanthren-3-one in 200 parts of tertiary butanol are added 0.27 part of osmium tetroxide in 16 parts of tertiary butanol, followed immediately by 60 parts of a 3.27-N hydrogen peroxide solution in tertiary butanol. In the course of the following two hours, a solution of 1.25 parts of osmium tetroxide in 80 parts of tertiary butanol is added. After standing at room temperature for 24 hours, the mixture is treated with 1500 parts of water and concentrated in vacuum at room temperature until about 320 parts of distillate have been collected. The residue is extracted with ethyl acetate and the extract is washed with water, dried over sodium sulfate, filtered, and evaporated to dryness. The residue is taken up in 1000 parts of methanol and refluxed for 30 minutes with a solution of 9 parts of sodium sulfite in 200 parts of water. The reaction mixture is concentrated to about one-half of its original volume under nitrogen and extracted with ethyl acetate. This extract is washed with water, dried over sodium sulfate and evaporated. The residue contains a mixture of 13-methyl-17-glycolyl-17-hydroxy-1,2,3,6,7,8,9,10,11,12,13,14,16,17-tetradecahydro-15H-cyclopenta[a]phenanthren-3-one and 17-(α,β-dihydroxyethyl)-17-hydroxy-13-methyl - 1,2,3,6,7,8,9,10,-11,12,13,14,16,17-tetradecahydro - 15H - cyclopenta[phenanthren-3-one. These compounds have the structural formulae

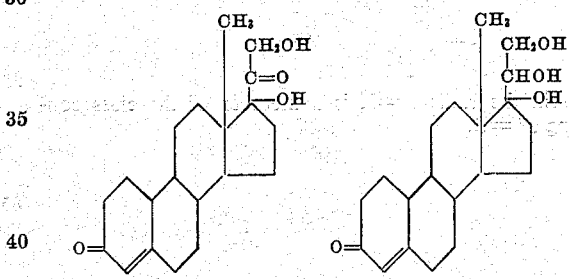

In addition the mixture contains a third compound which is apparently 4,5-dihydroxy-13-methyl-17-(β-hydroxyethylidene)perhydro - 15H - cyclopenta[a]phenanthren-3-one of the structural formula

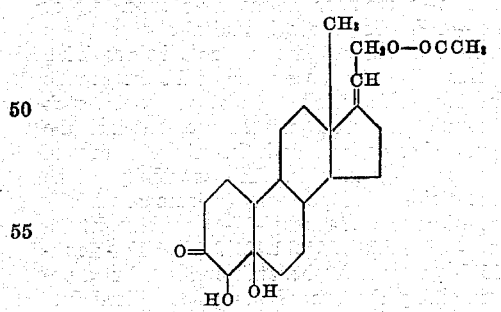

The above residue is dissolved in 35 parts of pyridine and 35 parts of acetic anhydride and kept at room temperature for 15 hours. Ice and, 2 hours later, water is added and the mixture is extracted with ethyl acetate. This extract is washed with dilute hydrochloric acid, sodium bicarbonate and water. After drying over sodium sulfate, the extract is evaporated under vacuum and the residue is chromatographed over 250 parts of silica gel. The column is eluted first with 1500 parts of a 10% solution of ethyl acetate in benzene. Elution with 500 parts each of a 10% and a 15% solution of ethyl acetate in benzene yields unreacted starting material. The column is next washed with an additional 500 parts of a 15% solution of ethyl acetate in benzene. Elution with a further 500-part portion of such a 15% solution and evaporation of the solvent yields a residue which, when crystallized from a mixture of ethyl acetate and petroleum ether and then from ether, forms crystals melting at about 185–187° C. This material gives a positive blue tetrazolium test and does not have a specific absorption maximum in the ultraviolet spectrum between 220 and 330 millimicrons. The infrared spectrum shows maxima at about 2.78, 5.78, 6.9, 7.3, 8.06, 8.79, 9.21, 9.5, 9.75, 10.3, 10.55, 10.8 and 11.3 microns. The compound is apparently 4-acetoxy-5-hydroxy-13-methyl-17-(β-acetoxyethylidene)perhydro-15H-cyclopenta[a]phenanthren-3-one of the structural formula

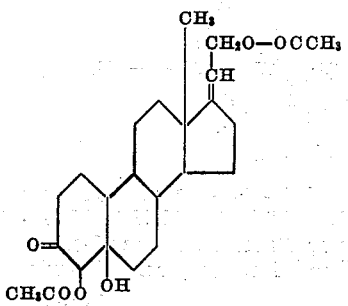

Elution of the column with 2000 parts of a 20% ethyl acetate in benzene solution, concentration of the eluate under vacuum and repeated recrystallizations from aqueous methanol and then from a mixture of ethyl acetate and petroleum ether yields the 13-methyl-17-(β-acetoxyacetyl) - 17 - hydroxy - 1,2,3,6,7,8,9,10,11,12,13,14,16,17 - tetradecahydro - 15H - cyclopenta[a]phenanthren - 3 - one melting at about 233–235° C. A 1% chloroform solution shows a molecular rotation of $[\alpha]_D = +88°$. The ultraviolet absorption spectrum shows a maximum at 242 millimicrons with a molecular extinction coefficient of 17,700. This compound has the structural formula

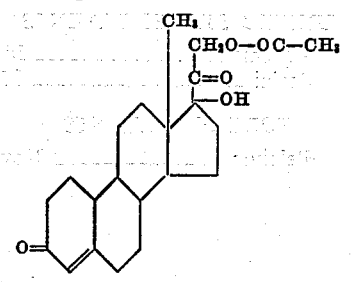

Further elution of the chromatography column with 2000 parts of a 20% solution and 1000 parts of a 30% solution of ethyl acetate in benzene and concentration of the eluate yields the 17-(α,β-diacetoxyethyl)-17-hydroxy-13 - methyl - 1,2,3,6,7,8,9,10,11,12,13,14,16,17 - tetradecahydro-15H-cyclopenta[a]phenanthren-3-one which, recrystallized from ethyl acetate and petroleum ether, melts at about 194–196° C. The molecular rotation of an 0.28% chloroform solution is $[\alpha]_D = +13.5°$. This compound has the structural formula

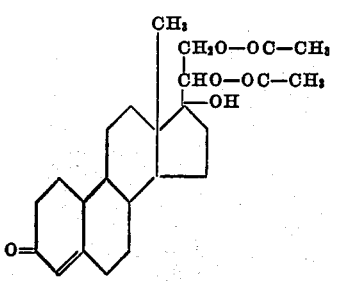

Example 6

To a solution of 26 parts of 13-methyl-17-(β-acetoxyacetyl) - 17 - hydroxy - 1,2,3,6,7,8,9,10,11,12,13,14,16,17 - tetradecahydro - 15H - cyclopenta[a]phenanthren - 3 - one in 4000 parts of methanol are added 700 parts of a 0.1-N sodium hydroxide solution by gradual addition in the course of 3 minutes. The reaction mixture is maintained at 25° C. for 20 minutes and then treated with 15,000 parts of water. After standing at 25° C. for an additional 30 minutes, the mixture is neutralized with 20% aqueous acetic acid, 7000 parts of solvent are distilled off under vacuum and the residue is stored at 0° C. for 15 hours. The precipitate is collected on a filter, washed with water and recrystallized from a mixture of ethyl acetate and petroleum ether. An additional yield is obtained by extracting the mother liquor with ethyl acetate. The extract is washed with water and saturated sodium chloride solution, dried, evaporated and recrystallized from ethyl acetate and petroleum ether. The 13-methyl - 17 - glycolyl - 17 - hydroxy - 1,2,3,6,7,8,9,10,11, 12,13,14,16,17 - tetradecahydro - 15H - cyclopenta[a] phenanthren-3-one thus obtained melts at about 177–180° C. The molecular rotation of an 0.816% chloroform solution is $[\alpha]_D = +59.2°$.

Example 7

A solution of 10 parts of 17-(β-acetoxyethylidene)-13-methyl - 1,2,3,6,7,8,9,10,11,12,13,14,16,17 - tetradeca - hydro-15H-cyclopenta[a]phenanthren-3-one in 700 parts of ether, dried by distillation over sulfuric acid, is cooled to 0° C. and treated with a solution of 8 parts of osmium tetroxide in 700 parts of dry ether. The reaction mixture is permitted to stand at room temperature for 5 days after which the ether is removed by decantation and the black residue is taken up in 1000 parts of methanol and treated with a solution of 3 parts of sodium sulfite in 50 parts of water. After refluxing for one hour, the reaction mixture is diluted with water and extracted with ethyl acetate. This extract is washed with water and with saturated aqueous sodium chloride solution, dried over anhydrous sodium sulfate and evaporated under vacuum. The residue is dissolved in 500 parts of a 1-N methanolic potassium hydroxide solution and refluxed for 15 minutes. The mixture is then diluted with water and extracted with ethyl acetate. This extract is washed with saturated sodium chloride solution, dried and evaporated to yield 13-methyl - 17 - (α,β - dihydroxyethyl) - 17-hydroxy-1,2-3,6,7,8,9,10,11,12,13,14,16,17 - tetradecahydro - 15H-cyclopenta[a]phenanthren-3-one. This compound is identical with the one obtained by chromatography of the non-acetylated reaction mixture obtained in Example 5. The compound shows infrared absorption maxima at 2.9, 5.84, 6.0, 6.19, 7.88, 8.22, 9.49, 10.0, 10.30, 11.10, 11.30, and 11.70 microns.

Example 8

A mixture of 100 parts of 13-methyl-17-(α,β-dihydroxyethyl) - 17 - hydroxy - 1,2,3,6,7,8,9,10,11,12,13,14,16,17,-tetradecahydro-15H-cyclopenta[a]phenanthren-3-one, 34 parts of acetic anhydride and 250 parts of pyridine is maintained for 40 hours at −18° C. Chipped ice, and, 2 hours later, water is added and the mixture is extracted with ethyl acetate. The extract is washed successively with dilute hydrochloric acid, sodium bicarbonate and water, and then dried over anhydrous sodium sulfate and evaporated to yield 13-methyl-17-(α-hydroxy-β-acetoxyethyl) - 17 - hydroxy - 1,2,3,6,7,8,9,10,11,12,13,14,16,17,-tetradecahydro - 15H - cyclopenta[a]phenanthren - 3 - one which has the structural formula

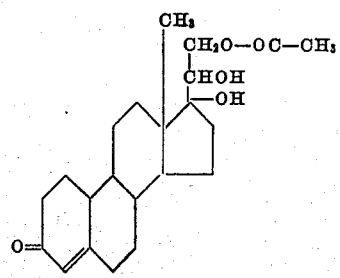

Example 9

To a solution of 20 parts of 13-methyl-17-(α-hydroxy-β-acetoxyethyl)-17-hydroxy-1,2,3,6,7,8,9,10,11,12,13,14,16,17-tetradecahydro-15H-cyclopenta[a]phenanthren-3-one in 150 parts of pyridine is added a suspension of 15.5 parts of chromium trioxide in 150 parts of pyridine. The reaction vessel is closed and the contents are mixed intimately and allowed to stand at 25° C. for 12 hours. The mixture is then poured into water and extracted with ethyl acetate. This extract is washed successively with dilute hydrochloric acid, sodium bicarbonate and water, dried over anhydrous sodium sulfate and evaporated. The residue is recrystallized from a mixture of ethyl acetate and petroleum ether. The 13-methyl-17-(β-acetoxyacetyl)-17-hydroxy-1,2,3,6,7,8,9,10,11,12,13,14,16,17-tetradecahydro-15H-cyclopenta[a]phenanthren-3-one thus obtained melts at about 235° C.

I claim:

1. A compound of the structural formula

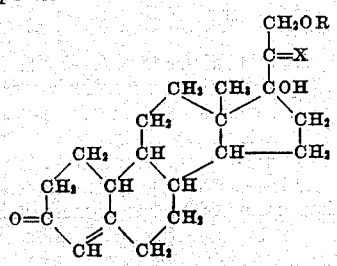

wherein =X is a member of the class consisting of =O,

and

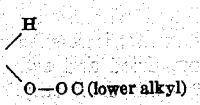

radicals and R is a member of the class consisting of hydrogen and —OC—(lower alkyl) radicals.

2. 13-methyl-17-glycolyl-17-hydroxy-1,2,3,6,7,8,9,10,11,12,13,14,16,17-tetradecahydro-15H-cyclopenta[a]phenanthren-3-one.

3. 13-methyl-17-(α,β-dihydroxyethyl)-17-hydroxy-1,2,3,6,7,8,9,10,11,12,13,14,16,17-tetradecahydro-15H-cyclopenta[a]phenanthren-3-one.

4. A compound of the structural formula

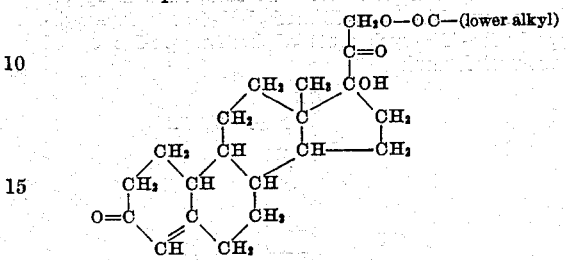

5. 13-methyl-17-(β-acetoxyacetyl)-17-hydroxy-1,2,3,6,7,8,9,10,11,12,13,14,16,17-tetradecahydro-15H-cyclopenta[a]phenanthren-3-one.

6. A compound of the general formula

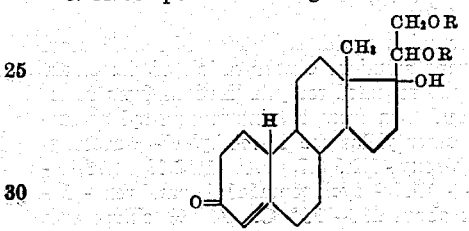

wherein R is a member of the class consisting of hydrogen and acetyl.

References Cited in the file of this patent

UNITED STATES PATENTS

| | | |
|---|---|---|
| 2,324,522 | Logemann | July 20, 1943 |
| 2,437,564 | Serini | Mar. 9, 1948 |

FOREIGN PATENTS

| | | |
|---|---|---|
| 503,510 | Belgium | Nov. 26, 1951 |